(12) United States Patent
Watanabe et al.

(10) Patent No.: US 11,822,396 B2
(45) Date of Patent: Nov. 21, 2023

(54) DISPLAY DEVICE

(71) Applicant: Japan Display Inc., Tokyo (JP)

(72) Inventors: Yoshihiro Watanabe, Tokyo (JP);
Yoshikatsu Imazeki, Tokyo (JP);
Yoichi Kamijo, Tokyo (JP); Koichi Miyasaka, Tokyo (JP); Shuichi Osawa, Tokyo (JP)

(73) Assignee: Japan Display Inc., Tokyo (JP)

( * ) Notice: Subject to any disclaimer, the term of this patent is extended or adjusted under 35 U.S.C. 154(b) by 525 days.

(21) Appl. No.: 17/186,333

(22) Filed: Feb. 26, 2021

(65) Prior Publication Data

US 2021/0181816 A1      Jun. 17, 2021

Related U.S. Application Data

(63) Continuation of application No. PCT/JP2019/023385, filed on Jun. 12, 2019.

(30) Foreign Application Priority Data

Aug. 30, 2018   (JP) ................................. 2018-161676

(51) Int. Cl.
   *G06F 1/18*   (2006.01)
   *G02F 1/1362*   (2006.01)

(52) U.S. Cl.
   CPC .............. *G06F 1/189* (2013.01); *G06F 1/181* (2013.01); *G02F 1/136286* (2013.01)

(58) Field of Classification Search
   None
   See application file for complete search history.

(56) References Cited

U.S. PATENT DOCUMENTS

| 2010/0026662 A1 | 2/2010 | Oohira |
| 2012/0055703 A1 | 3/2012 | Ishimatsu et al. |
| 2012/0320324 A1* | 12/2012 | Doi ..................... G02F 1/13338 349/122 |

(Continued)

FOREIGN PATENT DOCUMENTS

| JP | 2008216966 A | 9/2008 |
| JP | 2010168437 A | 8/2010 |

(Continued)

OTHER PUBLICATIONS

Chinese Office Action dated Nov. 14, 2022 in corresponding Chinese Application No. 201980056614.2.

(Continued)

*Primary Examiner* — Ashok Patel
(74) *Attorney, Agent, or Firm* — K&L Gates LLP

(57) ABSTRACT

According to one embodiment, a display device includes a first insulating substrate including a first substrate end, a second insulating substrate including an outer surface and a second substrate end, an electrode located between the first substrate end and the second substrate end, and a transparent conductive layer disposed on a side on which the outer surface is located. The outer surface includes a flat portion and a sloping portion. A thickness on a side on which the second substrate end is located is less than a thickness on a side on which the flat portion is located. The transparent conductive layer overlaps the sloping portion and is electrically connected to the electrode.

18 Claims, 10 Drawing Sheets

(56) References Cited

U.S. PATENT DOCUMENTS

| | | | |
|---|---|---|---|
| 2014/0168152 | A1 | 6/2014 | Ishizaki et al. |
| 2015/0268795 | A1 | 9/2015 | Kurasawa et al. |
| 2018/0314099 | A1 | 11/2018 | Saitoh et al. |
| 2019/0064562 | A1 | 2/2019 | Nakui et al. |

FOREIGN PATENT DOCUMENTS

| | | | |
|---|---|---|---|
| JP | 2010199527 A | 9/2010 |
| JP | 2011180252 A | 9/2011 |
| JP | 2014120003 A | 6/2014 |
| JP | 2014199472 A | 10/2014 |
| JP | 2015055789 A | 3/2015 |
| JP | 2015184741 A | 10/2015 |
| WO | 2017077995 A1 | 5/2017 |
| WO | 2017150403 A1 | 9/2017 |

OTHER PUBLICATIONS

International Search Report issued in Application No. PCT/JP2019/023385, dated Sep. 3, 2019.

* cited by examiner

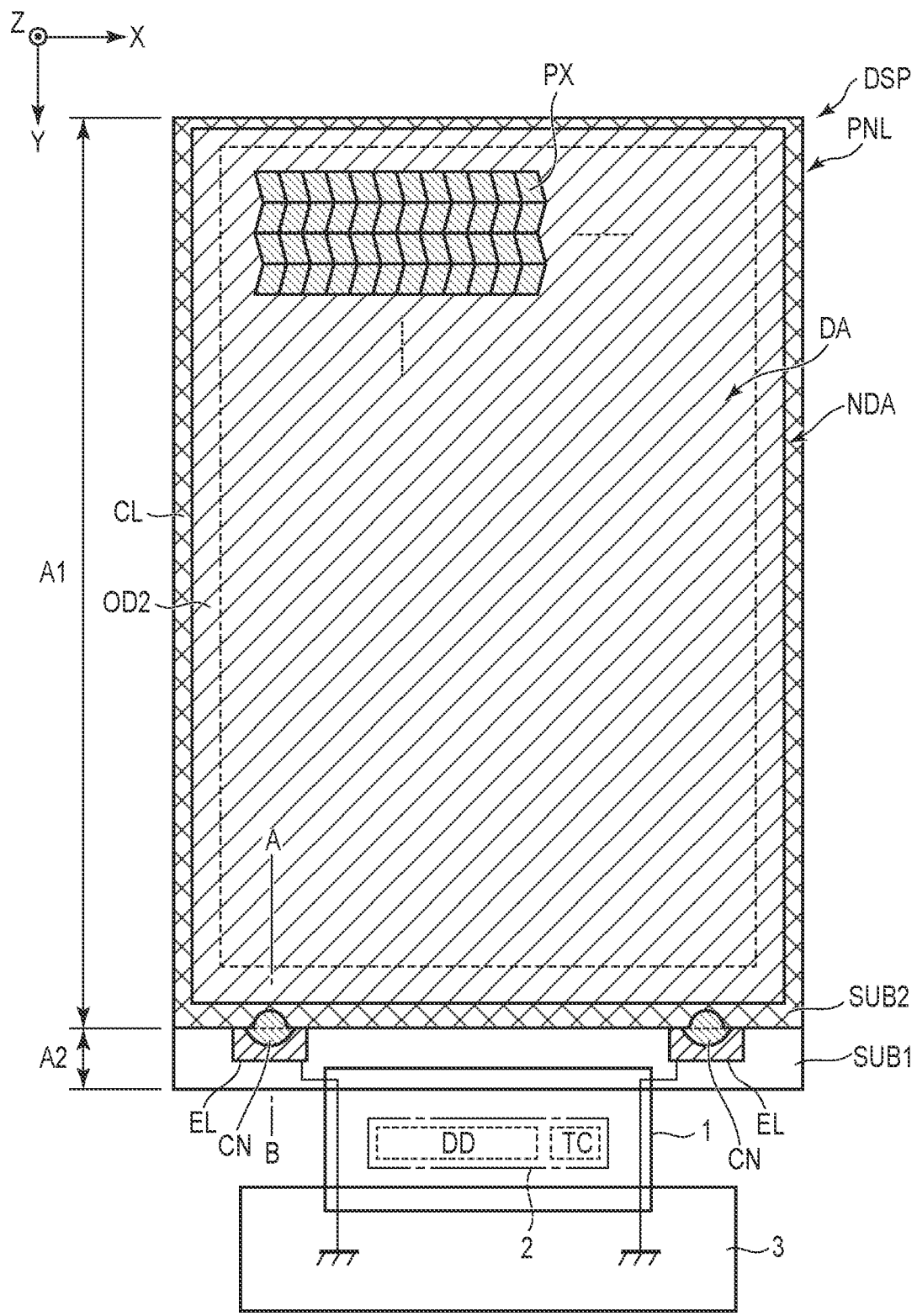
F I G. 1

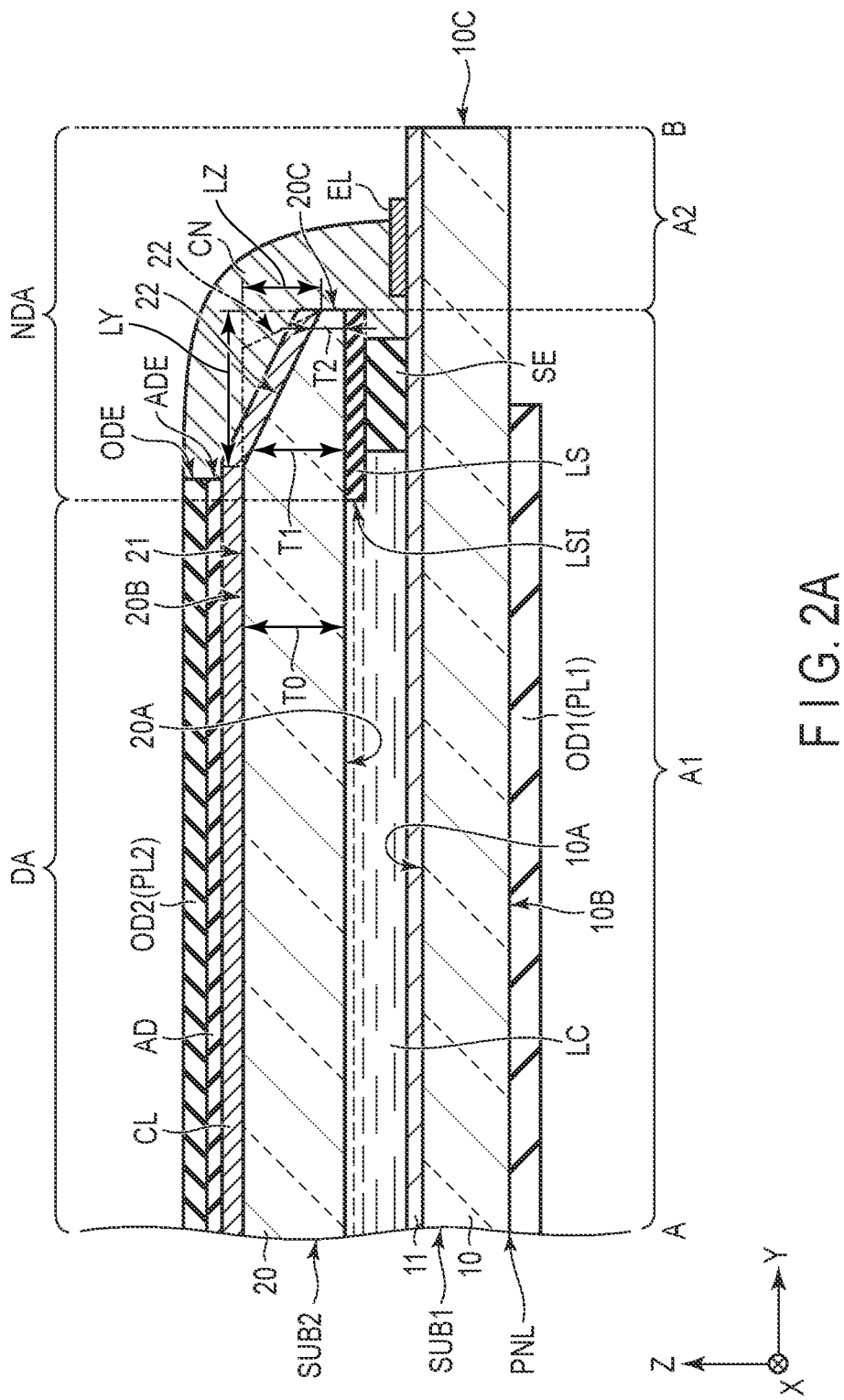
F I G. 2A

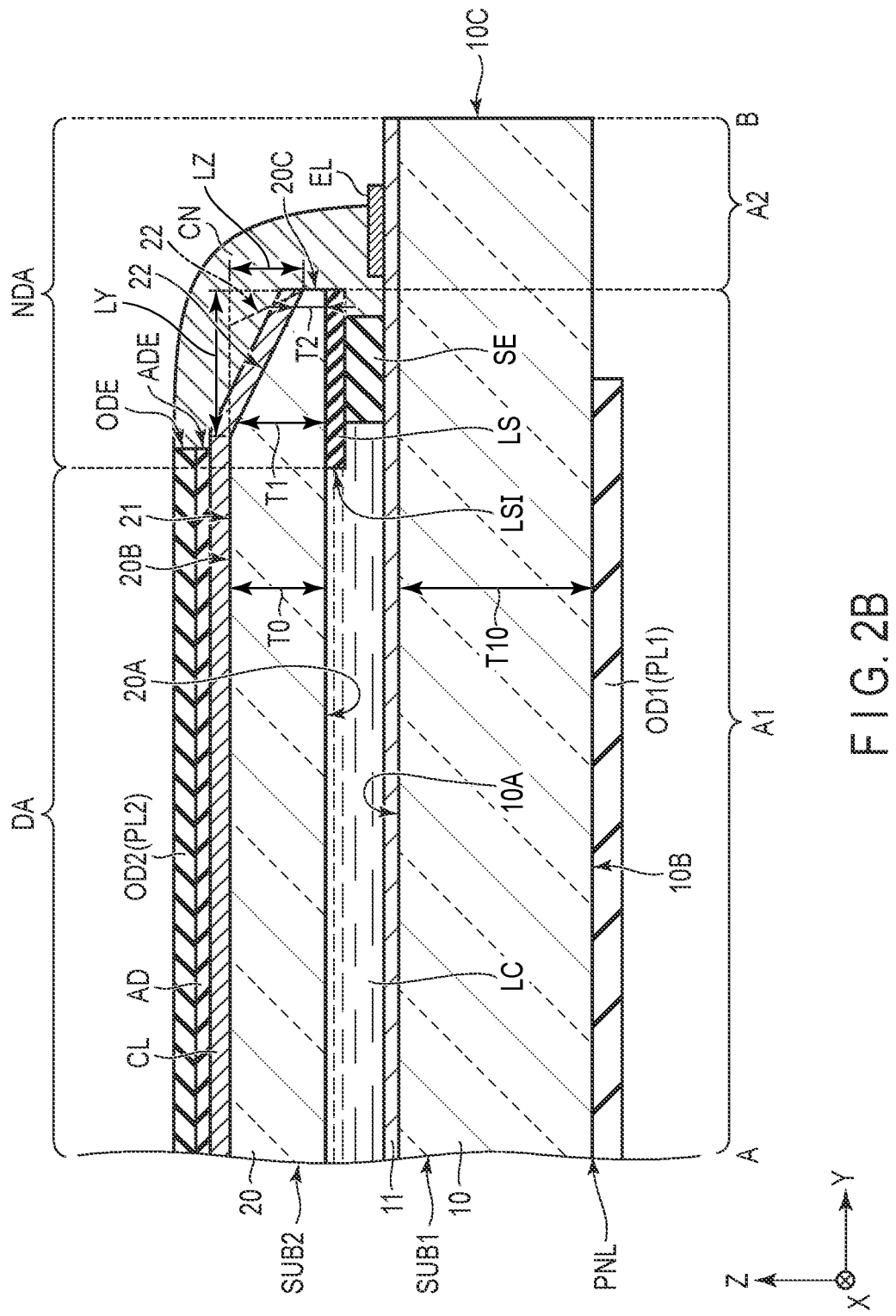
F I G. 2B

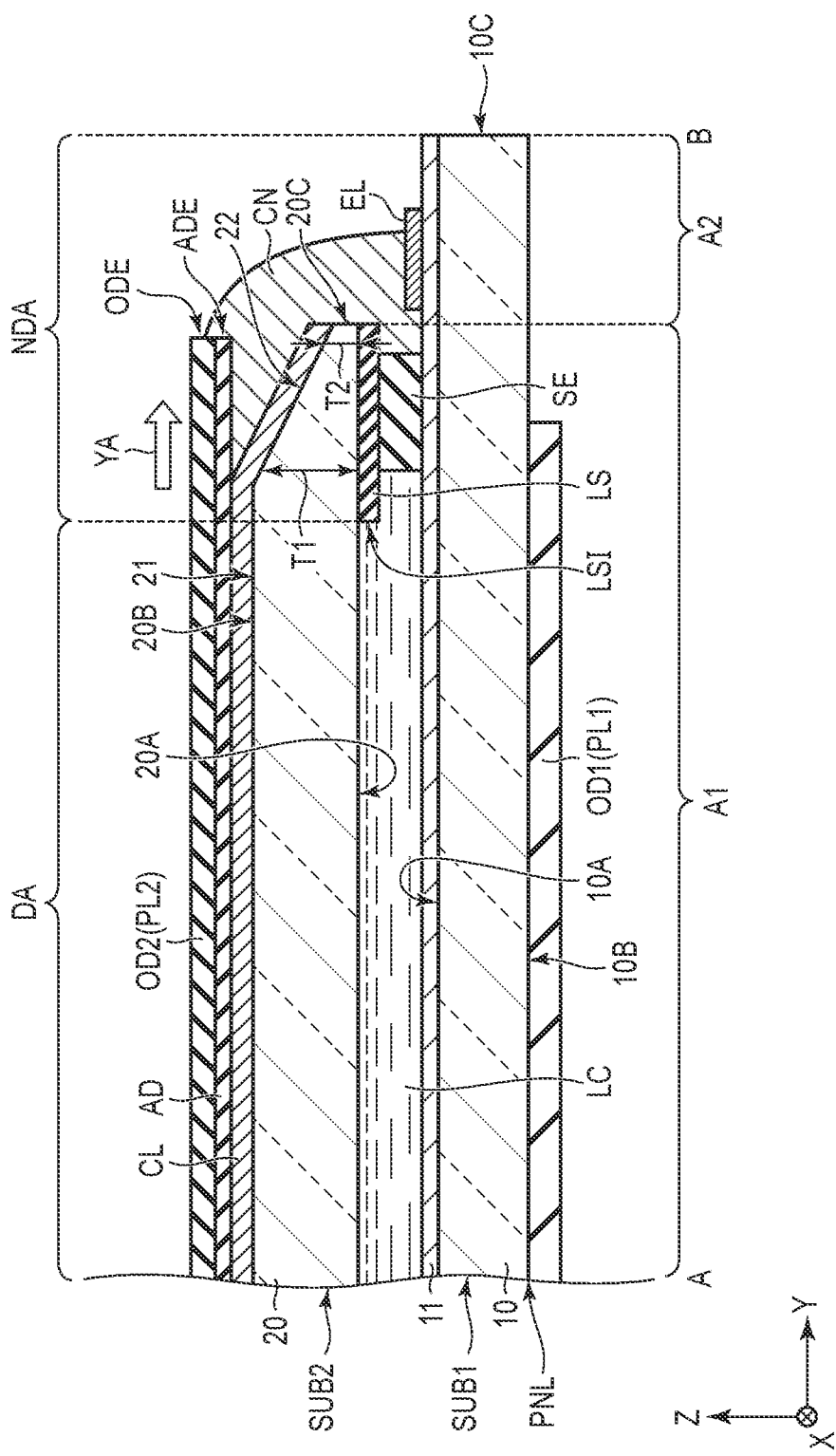
F I G. 3

DISPLAY DEVICE

CROSS-REFERENCE TO RELATED APPLICATIONS

This application is a Continuation Application of PCT Application No. PCT/JP2019/023385, filed Jun. 12, 2019 and based upon and claiming the benefit of priority from Japanese Patent Application No. 2018-161676, filed Aug. 30, 2018, the entire contents of all of which are incorporated herein by reference.

FIELD

Embodiments described herein relate generally to a display device.

BACKGROUND

Recently, in a lateral electric field type liquid crystal display device, from the perspective of static buildup prevention or the like, a technology of electrically connecting a transparent conductive film disposed on a surface of one substrate and an electrode of a ground potential disposed in the other substrate by a conductive member has been known. A polarizer is disposed on the transparent conductive film. When the polarizer expands, the polarizer and the conductive member contact each other, and the contact area between the conductive member and the transparent conductive film may be reduced. In particular, in association with the demand for a narrower frame, the polarizer and the conductive member tend to be disposed close to each other, and are affected easily even by slight expansion of the polarizer.

SUMMARY

The present disclosure relates generally to a display device.

According to one embodiment, a display device includes a first insulating substrate including a first substrate end, a second insulating substrate including an outer surface and a second substrate end, an electrode located between the first substrate end and the second substrate end, and a transparent conductive layer disposed on a side on which the outer surface is located. The outer surface includes a flat portion and a sloping portion. A thickness on a side on which the second substrate end is located is less than a thickness on a side on which the flat portion is located. The transparent conductive layer overlaps the sloping portion and is electrically connected to the electrode.

BRIEF DESCRIPTION OF THE DRAWINGS

FIG. 1 is a plan view showing the external appearance of a display device DSP.

FIG. 2A is a cross-sectional view of a display panel PNL in the first embodiment along line A-B shown in FIG. 1.

FIG. 2B is another cross-sectional view of the display panel PNL along line A-B shown in FIG. 1.

FIG. 3 is another cross-sectional view of the display panel PNL along line A-B shown in FIG. 1.

DETAILED DESCRIPTION

Figure 4:
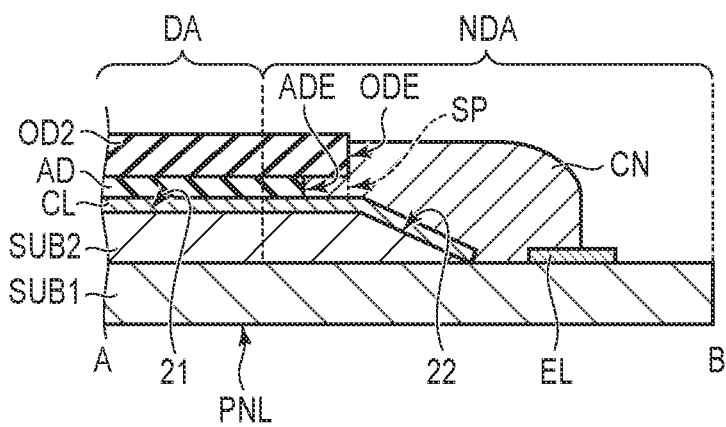
FIG. 4 is a cross-sectional view of a display panel PNL in the second embodiment.

In general, according to one embodiment, there is provided a display device comprising: a first insulating substrate comprising a first substrate end; a second insulating substrate comprising an inner surface opposed to the first insulating substrate, an outer surface on an opposite side to the inner surface, and a second substrate end; an electrode located between the first substrate end and the second substrate end and maintained at a predetermined potential; and a transparent conductive layer disposed on a side on which the outer surface is located. The outer surface comprises a flat portion and a sloping portion formed from the flat portion to the second substrate end. The sloping portion slopes such that a thickness on a side on which the second substrate end is located is less than a thickness on a side on which the flat portion is located. The transparent conductive layer overlaps the sloping portion and is electrically connected to the electrode.

Embodiments will be described hereinafter with reference to the accompanying drawings. The disclosure is merely an example, and proper changes in keeping with the spirit of the invention, which are easily conceivable by a person of ordinary skill in the art, come within the scope of the invention as a matter of course. In addition, in some cases, in order to make the description clearer, the widths, thicknesses, shapes and the like, of the respective parts are illustrated schematically in the drawings, rather than as an accurate representation of what is implemented. However, such schematic illustration is merely exemplary, and in no way restricts the interpretation of the invention. In addition, in the specification and drawings, constituent elements which function in the same or a similar manner to those described in connection with preceding drawings are denoted by the same reference numbers, and detailed description of them which is considered redundant may be arbitrarily omitted.

In the embodiments, a liquid crystal display device will be described as an example of a display device DSP. The main configuration disclosed in the embodiments can also be applied to a self-luminous display device comprising an organic electroluminescent display element or the like, an electronic paper display device comprising an electrophoretic element or the like, a display device employing microelectromechanical systems (MEMS), a display device employing electrochromism, and the like.

First Embodiment

FIG. 1 is a plan view showing the external appearance of a display device DSP. In one example, a first direction X, a second direction Y and a third direction Z are orthogonal to one another. However, they may cross one another at an angle other than 90 degrees. The first direction X and the second direction Y correspond to directions parallel to the main surface of a substrate constituting the display device DSP, and the third direction Z corresponds to the thickness direction of the display device DSP. For example, the first direction X corresponds to the short side direction of the display device DSP, and the second direction Y corresponds to the long side direction of the display device DSP. In the specification, an observation position from which the display device DSP is observed is assumed to be located on a side on which the tip of an arrow indicating the third direction Z is located, and viewing toward an XY-plane defined by the first direction X and the second direction Y from this observation position is referred to as planar view.

The display device DSP comprises a display panel PNL, a flexible printed circuit board 1, an IC chip 2 and a circuit board 3.

The display panel PNL is, for example, a liquid crystal display panel, and comprises a first substrate SUB1, a second substrate SUB2, and a liquid crystal layer LC which will be described later. The display panel PNL comprises a display portion DA which displays an image, and a frame-shaped non-display portion NDA which surrounds the display portion DA. The first substrate SUB1 comprises a first region A1 and a second region A2 which are arranged in the second direction Y. The second substrate SUB2 overlaps the first substrate SUB1 in the first region A1 but does not overlap the second region A2. The display portion DA is included in the first region A1.

The display portion DA comprises a plurality of pixels PX disposed in a matrix in the first direction X and the second direction Y. The pixel PX here indicates a minimum unit which can be individually controlled according to a pixel signal, and is referred to also as a sub-pixel. The pixel PX is, for example, any of a red pixel which displays red, a green pixel which displays green, a blue pixel which displays blue, and a white pixel which displays white.

The flexible printed circuit board 1 is mounted on the second region A2 and is electrically connected to the circuit board 3. The IC chip 2 is mounted on the flexible printed circuit board 1. However, the IC chip 2 may be mounted on the second region A2. The IC chip 2 includes a built-in display driver DD. The display driver DD outputs a signal required for image display in an image display mode of displaying an image. In the example shown in FIG. 1, the IC chip 2 includes a built-in touch controller TC. The touch controller TC controls a touch sensing mode of detecting approach an object to or contact of an object with the display device DSP.

The first substrate SUB1 comprises an electrode EL in the second region A2. The electrode EL is, for example, grounded via the flexible printed circuit board 1 but only has to be maintained at a predetermined potential. The predetermined potential is supplied to the electrode by a DC current having a ground potential or a fixed potential of several volts or an AC current having a predetermined amplitude. In the example shown in FIG. 1, the electrode EL is disposed in two places across the flexible printed circuit board 1. However, the electrode EL may be disposed in only one place or three or more places.

The second substrate SUB2 comprises a transparent conductive film CL as an example of a transparent conductive layer. The transparent conductive film CL is disposed over substantially the entire surface of the second substrate SUB1 and overlaps the display portion DA. The transparent conductive film CL is formed of a transparent conductive material such as indium tin oxide (ITO) or indium zinc oxide (IZO).

An optical element OD2 overlaps the transparent conductive film CL. In addition, the optical element OD2 overlaps the display portion DA and extends to the non-display portion NDA.

A connection member CN is located in the non-display portion NDA and electrically connects the electrode EL and the transparent conductive film CL. The connection member CN is formed of, for example, a resin material having conductivity.

FIG. 2A is a cross-sectional view of the display panel PNL in the first embodiment along line A-B shown in FIG. 1. Note that only the configuration required for explanation is illustrated here, and the first substrate SUB1 and the second substrate SUB2 are simplified. In the specification, a direction from the first substrate SUB1 toward the second substrate SUB2 is referred to as an upper side (or simply as above), and a direction from the second substrate SUB2 toward the first substrate SUB1 is referred to as a lower side (or simply as below). When described as the second member above the first member and the second member below the first member, the second member may be in contact with the first member or apart from the first member.

In the display panel PNL, the liquid crystal layer LC is located between the first substrate SUB1 and the second substrate SUB2. The first substrate SUB1 comprises a first insulating substrate 10, a circuit element 11, the electrode EL and the like. The second substrate SUB2 comprises a second insulating substrate 20 opposed to the first insulating substrate 10, a light-shielding layer LS and the like. The first insulating substrate 10 and the second insulating substrate 20 are transparent substrates such as glass substrates or flexible resin substrates.

The first insulating substrate 10 comprises an inner surface 10A opposed to the second insulating substrate 20, an outer surface 10B on an opposite side to the inner surface 10A, and a first substrate end 10C. The circuit element 11 is disposed on the inner surface 10A, and includes a scanning line, a signal line, a switching element, a pixel electrode, a common electrode, an inorganic insulating film, an organic insulating film, an alignment film and the like.

The second insulating substrate 20 comprises an inner surface 20A opposed to the first insulating substrate 10 in the first region A1, an outer surface 20B on an opposite side to the inner surface 20A, and a second substrate end 20C. The second substrate end 20C is located at the boundary between the first region A1 and the second region A2. The light-shielding layer LS is disposed on the inner surface 20A and is located in the non-display portion NDA. The boundary between the display portion DA and the non-display portion NDA is defined by, for example, an inner circumferential portion LSI of the light-shielding layer LS. A sealant SE is located in the non-display portion NDA, and bonds the first substrate SUB1 and the second substrate SUB2 together and seals in the liquid crystal layer LC. The sealant SE is disposed at a position overlapping the light-shielding layer LS.

The electrode EL is located between the first substrate end 10C and the second substrate end 20C. In addition, the electrode EL is located on the first insulating substrate 10 in the second region A2. The second substrate SUB2 is not disposed on the electrode EL.

The transparent conductive film CL is disposed on the outer surface 20B and is disposed over the display portion DA and the non-display portion NDA. The optical element OD2 including a polarizer PL2 is bonded to the transparent conductive film CL by a transparent adhesive layer AD. An optical element OD1 including a polarizer PL1 is bonded to the outer surface 10B, but illustration of an adhesive layer is omitted. Each of the optical elements OD1 and DO2 may comprise a retarder, a scattering layer, an antireflective layer or the like as needed.

The connection member CN is superposed above the light-shielding layer LS in the second substrate SUB2 and is in contact with the transparent conductive film CL. The connection member CN is in contact with the electrode EL in the first substrate SUB1. The connection member CN is in contact with the second substrate end 20C and is disposed continuously between the transparent conductive film CL and the electrode EL. Accordingly, the transparent conductive film CL and the electrode EL are electrically connected via the connection member CN.

Now, attention is focused on the outer surface 20B. The outer surface 20B comprises a flat portion 21 and a sloping portion 22. The flat portion 21 overlaps the display portion DA and is a flat surface formed along the XY-plane. The sloping portion 22 overlaps the non-display portion NDA and is located between the flat portion 21 and the second substrate end 20C. The sloping portion 22 has a thickness T1 in the vicinity of the flat portion 21 and a thickness T2 in the vicinity of the second substrate end 20C. Note that a thickness in the specification is a length along the third direction Z.

The thickness T2 is less than the thickness T1. In addition, the difference between a thickness T0 in the flat portion 21 and the thickness T2 is, for example, greater than or equal to 0.1 mm, and the thickness T2 is less than or equal to ½ of the thickness T0. In other words, the second insulating substrate 20 comprises a tapered portion in which the thickness decreases toward the second substrate end 20C (or the electrode EL) in the non-display portion NDA.

Now, attention is focused on the relationship between a width LY of the sloping portion 22 and a height LZ of the sloping portion 22. The width LY corresponds to the length along the second direction Y of the sloping portion 22. The height LZ corresponds to the length LZ along the third direction Z of the sloping portion 22. In one example, in the sloping portion 22 shown by a solid line, the width LY is equal to the height LZ or greater than the height LZ (LY≥LZ). In addition, in another example, the sloping portion 22 may be formed in a shape shown by a dashed double-dotted line. In this case, the width LY is less than the height LZ (LY<LZ).

In the illustrated example, the sloping portion 22 is a flat surface crossing both the second direction Y and the third direction Z and hardly comprise projections and depressions. However the sloping portion 22 may be a surface having projections and depressions along the third direction Z. In addition, the sloping portion 22 may be a curved surface. Furthermore, the sloping portion 22 may be a flat surface crossing all the first direction X, the second direction Y and the third direction Z.

The inner surface 20A is a flat surface formed along the XY-plane in the display portion DA and the non-display portion NDA, and is opposed to the flat portion 21 and the sloping portion 22.

The transparent conductive film CL is disposed continuously in contact with both the flat portion 21 and the sloping portion 22. In the illustrated example, the transparent conductive film CL is located between the sloping portion 22 and the connection member CN. In the first embodiment, the transparent conductive film CL is electrically connected to the electrode EL via the connection member CN. However, as will be described later, the transparent conductive film CL may be directly in contact with the electrode EL and electrically connected to the electrode EL. In addition, the transparent conductive film CL may be apart from the sloping portion 22, and the transparent conductive film CL only has to be superposed above the sloping portion 22 in the third direction Z.

An end ODE of the optical element OD2 and an end ADE of the adhesive layer AD are located in the non-display portion NDA. In the illustrated example, the end ODE and the end ADE are superposed above the flat portion 21. However, they may be superposed above the sloping portion 22, above the second substrate end 20C, or between the first substrate end 10C and the second substrate end 20C. However, the adhesive layer AD is apart from the transparent conductive film CL above the sloping portion 22 and does not interfere with the contact between the connection member CN and the transparent conductive film CL.

FIG. 2B is another cross-sectional view of the display panel PNL along line A-B shown in FIG. 1. The example shown in FIG. 2B is different from the example shown in FIG. 2A in that a thickness T10 of the first insulating substrate 10 is greater than the thickness T0 in the flat portion 21 of the second insulating substrate 20 (T10>T0). The other configuration is the same as that of the example shown in FIG. 2A, and the constituent elements are denoted by the same reference numbers, and detailed description of them is omitted.

FIG. 3 is another cross-sectional view of the display panel PNL along line A-B shown in FIG. 1. The illustrated cross-sectional view shows a state where the optical element OD2 and the adhesive layer AD shown in FIG. 2A expand along the second direction Y, for example. As indicated by an arrow YA in FIG. 3, when the optical element OD2 and the adhesive layer AD expand along the second direction Y, the optical element OD2 and the adhesive layer AD may be superposed above the sloping portion 22.

In a comparative example where the second insulating substrate 20 does not comprise the sloping portion 22, when the optical element OD2 and the adhesive layer AD expand in the direction of the arrow YA, the connection member CN is pushed out in the direction of the arrow YA, and the contact area between the transparent conductive film CL and the connection member CN may be reduced.

On the other hand, according to the first embodiment, even when the optical element OD2 and the adhesive layer AD expand in the direction of the arrow YA, the connection member CN contacting the transparent conductive film CL in the sloping portion 22 hardly moves. Therefore, the reduction of the contact area between the transparent conductive film CL and the connection member CN is suppressed. Accordingly, poor connection associated with the reduction of the contact area between the transparent conductive film CL and the connection member CN can be suppressed. Consequently, the reduction of reliability can be suppressed.

In addition, the transparent conductive film CL is disposed in the sloping portion 22 in which the thickness decreases toward the electrode EL, and the difference in level along the third direction Z between the transparent conductive film CL and the electrode EL is reduced. Therefore, the disconnection due to level difference of the connection member CN disposed over the transparent conductive film CL and the electrode EL can be suppressed.

Furthermore, a discharge path can be formed from the transparent conductive film CL to the electrode EL of the ground potential via the connection member CN, and the static buildup of the second substrate SUB2 can be suppressed. Accordingly, the reduction of display quality due to static buildup can be suppressed.

Other embodiments will be described below. In each of the embodiments, only the configuration required for explanation will be illustrated and explained.

Second Embodiment

FIG. 4 is a cross-sectional view of the display panel PNL in the second embodiment. The second embodiment is different from the first embodiment in that the end ODE of the optical element OD2 projects more toward the electrode EL than the end ADE of the adhesive layer AD. That is, a space SP is formed between the transparent conductive film CL and the optical element OD2. The space SP is filled with the connection member CN, and the connection member CN is in contact with the transparent conductive film CL directly below the optical element OD2. The ends ODE and ADE are both located in the non-display portion NDA.

As compared with the first embodiment in which the end ADE is located directly below the end ODE, the contact area between the connection member CN and the transparent conductive film CL is increased.

Figure 5:
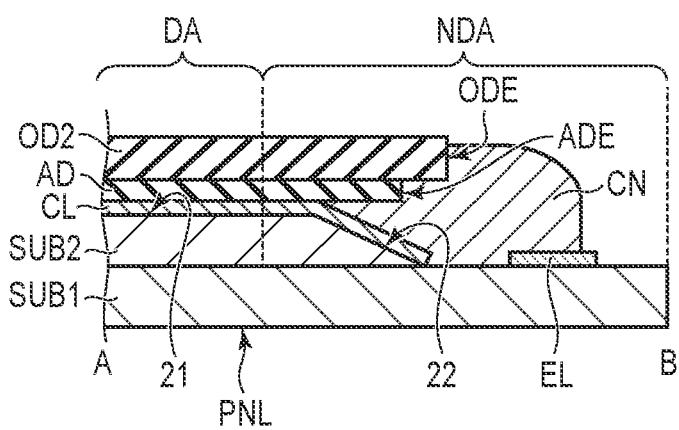
FIG. 5 is another cross-sectional view of the display panel PNL in the second embodiment.

FIG. 5 is another cross-sectional view of the display panel PNL in the second embodiment. Even when the optical element OD2 and the adhesive layer AD expand, the end ODE projects more toward the electrode EL than the end ADE. Therefore, the connection member CN remains between the end ODE and the end ADE, and the reduction of the volume of the connection member CN contacting the transparent conductive film CL is suppressed, and the increase of the electrical resistance of the connection member CN is suppressed.

Third Embodiment

Figure 6:
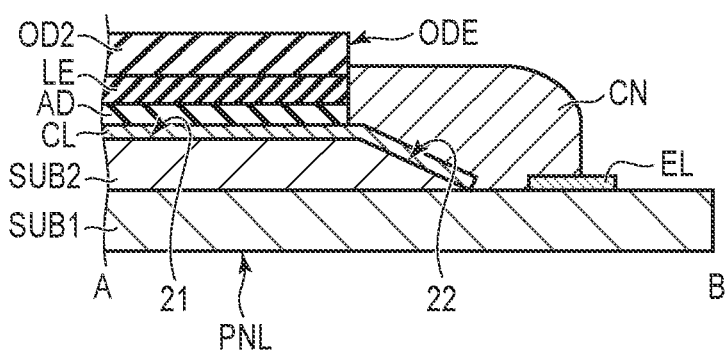
FIG. 6 is a cross-sectional view of a display panel PNL in the third embodiment.

FIG. 6 is a cross-sectional view of the display panel PNL in the third embodiment. The third embodiment is different from the first embodiment in comprising a low expansion layer LE between the adhesive layer AD and the optical element OD2. The thermal expansion coefficient of the low expansion layer LE is less than the thermal expansion coefficient of the optical element OD2. The low expansion layer LE is transparent and has optical isotropy (the retardation in the XY-plane is zero). For example, the low expansion layer LE is a support which supports a polarization layer and a retardation layer constituting the optical element OD2.

As compared with the first embodiment which does not comprise the low expansion layer LE, the optical element OD2 is disposed more upward, and the contact area between the end ODE and the connection member CN is reduced.

Figure 7:
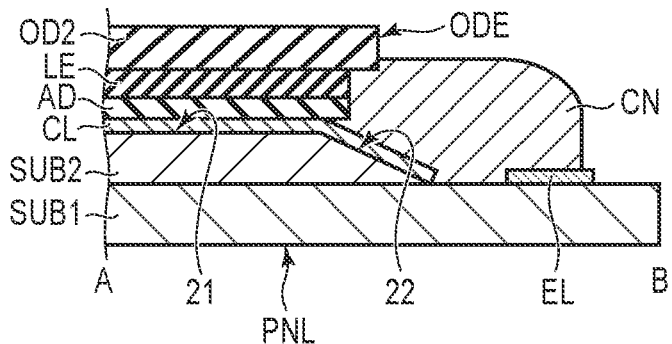
FIG. 7 is another cross-sectional view of the display panel PNL in the third embodiment.

FIG. 7 is another cross-sectional view of the display panel PNL in the third embodiment. Even when the optical element OD2 expands, the amount of expansion of the low expansion layer LE and the adhesive layer AD is less than the amount of expansion of the optical element OD2. In addition, since the contact area between the end ODE and the connection member CN is reduced, the amount of pushing out of the connection member CN associated with expansion of the optical element OD2 is reduced.

Fourth Embodiment

Figure 8:
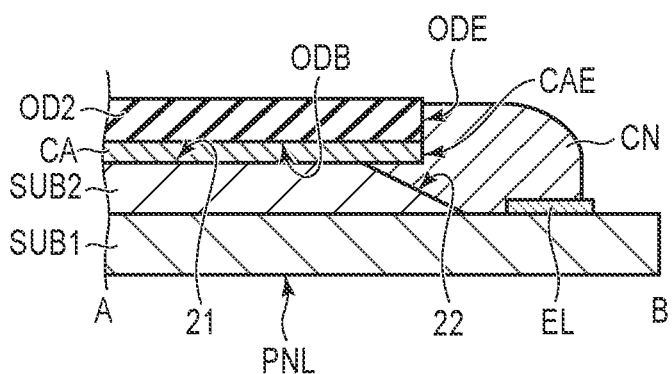
FIG. 8 is a cross-sectional view of a display panel PNL in the fourth embodiment.

FIG. 8 is a cross-sectional view of the display panel PNL in the fourth embodiment. The fourth embodiment is different from the first embodiment in that the optical element OD2 comprises a conductive adhesive agent CA which is another example of a transparent conductive layer. The adhesive agent CA contacts the flat portion 21 and bonds the optical element OD2 to the flat portion 21. In addition, the adhesive agent CA is apart from the sloping portion 22 above the sloping portion 22. The connection member CN is located between the sloping portion 22 and the adhesive agent CA. That is, the adhesive agent CA of the fourth embodiment has the functions of both the transparent conductive film CL and the adhesive layer AD in the first embodiment. The adhesive agent CA is a conductive adhesive agent obtained by dispersing particles in an adhesive agent or the like. The adhesive agent CA is in contact with a lower surface ODB of the optical element OD2. The end ODE and an end CAE of the adhesive agent CA overlap the sloping portion 22 across the connection member CN.

Figure 9:
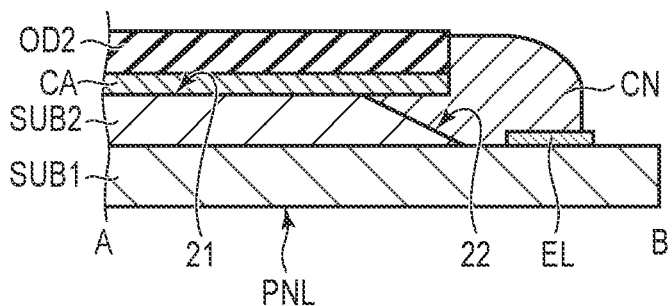
FIG. 9 is another cross-sectional view of the display panel PNL in the fourth embodiment.

FIG. 9 is another cross-sectional view of the display panel PNL in the fourth embodiment. When the optical element OD2 and the adhesive agent CA expand, in particular, in a region overlapping the sloping portion 22, an area in which the adhesive agent CA overlaps the sloping portion 22 increases according to the expansion. At this time, the connection member CN disposed in the sloping portion 22 hardly moves. Therefore, when the optical element OD2 and the adhesive agent CA expand, the contact area between the adhesive agent CA and the connection member CN increases, and reliability improves.

In addition, the adhesive agent CA has the functions of both the transparent conductive film for static buildup prevention and the adhesive layer of the optical element OD2. Therefore, the display panel PNL is made thinner, and the number of components can be reduced. Furthermore, as compared with when the transparent conductive film is formed separately by depositing a transparent conductive material, the formation cost of the transparent conductive film can be reduced.

Furthermore, although the first embodiment shown in FIG. 3 requires the region for disposing the connection member CN between the end ODE of the optical element OD2 and the second substrate end 20C along the second direction Y, the fourth embodiment does not require the region for disposing the connection member CN between the end ODE and the second substrate end 20C. Therefore, as compared with the first embodiment, the fourth embodiment can achieve an even narrower frame.

Fifth Embodiment

Figure 10:
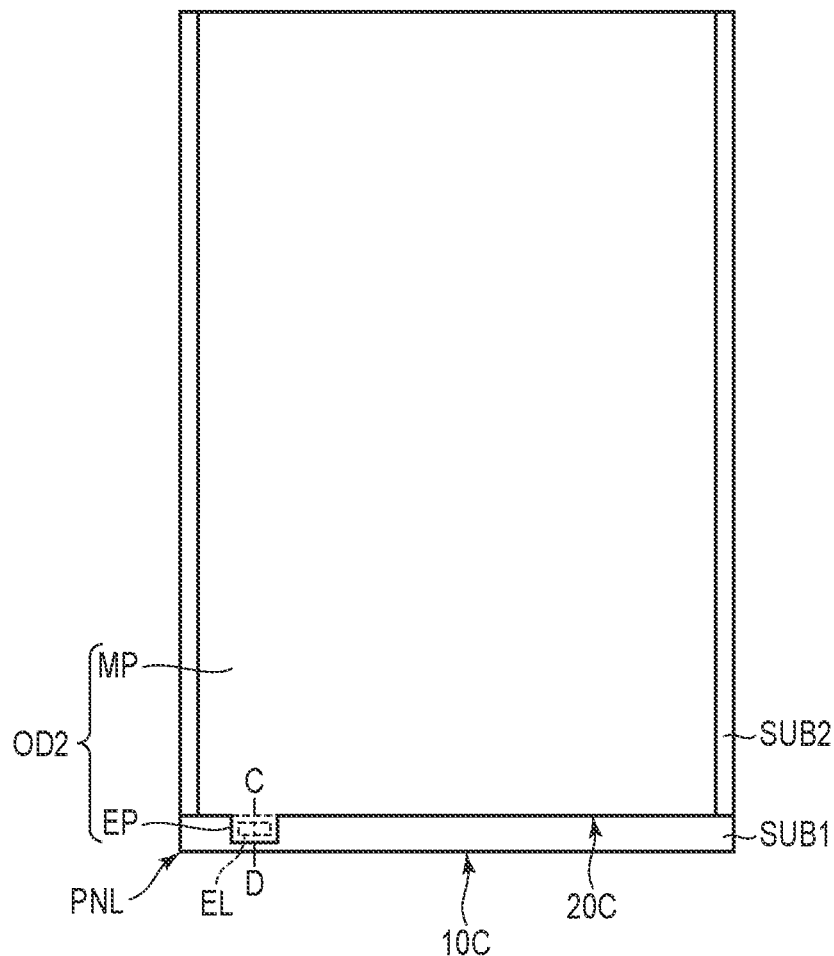
FIG. 10 is a plan view of a display panel PNL in the fifth embodiment.

FIG. 10 is a plan view of the display panel PNL in the fifth embodiment. The optical element OD2 applied to the fifth embodiment comprises a main body MP and an extension portion EP. The main body MP is superposed above the second substrate SUB2. The extension portion EP extends between the first substrate end 10C and the second substrate end 20C and is superposed above the electrode EL.

Figure 11:
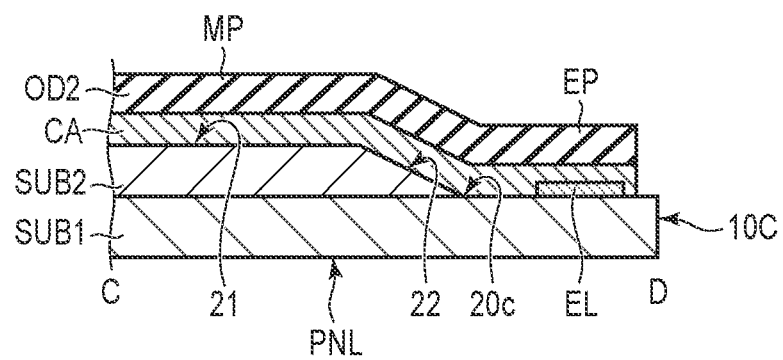
FIG. 11 is a cross-sectional view of the display panel PNL along line C-D shown in FIG. 10.

FIG. 11 is a cross-sectional view of the display panel PNL along line C-D shown in FIG. 10. Similarly to the fourth embodiment, the adhesive agent CA bonds the optical element OD2 to the second substrate SUB2 and the electrode EL. The adhesive agent CA is disposed continuously in contact with the flat portion 21, the sloping portion 22 and the electrode EL. The adhesive agent CA bonds the main body MP to the flat portion 21 and the sloping portion 22. In addition, the adhesive agent CA bonds the extension portion EP to the electrode EL between the first substrate end 10C and the second substrate end 20C.

Even when the optical element OD2 expands, the contact area between the adhesive agent CA and the electrode EL hardly changes.

In addition, the adhesive agent CA has the functions of the transparent conductive film for static buildup prevention, the adhesive layer of the optical element OD2, and the connection member connected to the electrode EL. Therefore, the number of components can be reduced. Furthermore, as compared with when the transparent conductive material and the connection member are formed separately, the cost can be reduced.

<<First Formation Method of Sloping Portion>>

Now, the first formation method of the sloping portion 22 will be described with reference to FIGS. 12A to 12D. Only the main parts of the first substrate SUB1 and the second substrate SUB2 are illustrated here.

Figure 12A:
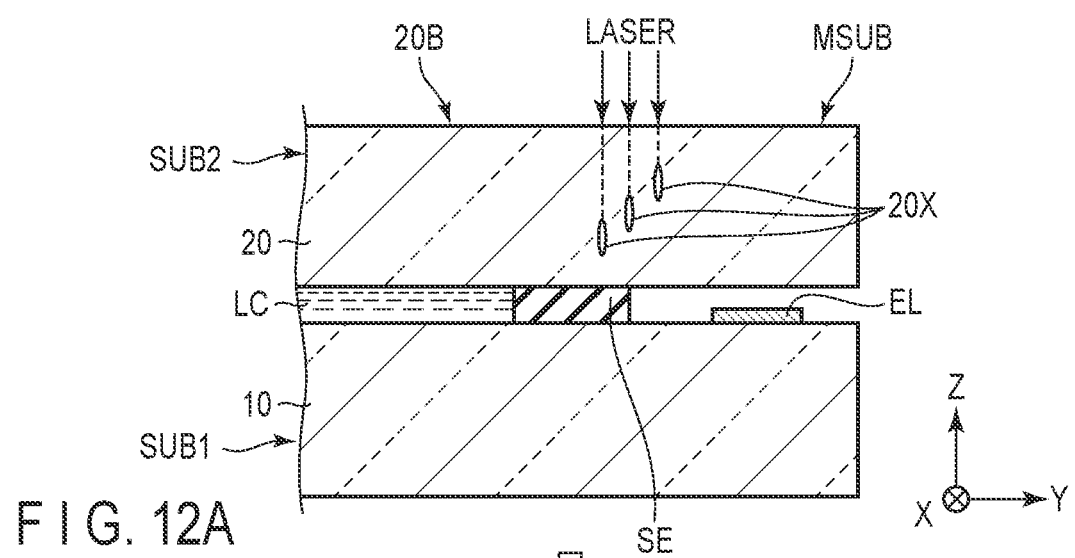
FIGS. 12A to 12D are illustrations for explaining the first formation method of a sloping portion 22.

As shown in FIG. 12A, in a mother substrate MSUB composed of the first substrate SUB1 and the second substrate SUB2 bonded together, laser light is emitted from the outer surface 20B side of the second insulating substrate 20, and the laser light is condensed inside the second insulating substrate 20. As the light source at this time, from the perspective of hardly damaging the periphery of a condensing part 20X of laser light either thermally or chemically, a femtosecond laser device which emits laser light having a pulse width of femtoseconds is preferable. As the laser light is emitted, the condensing part 20X is modified. In addition, the condensing part 20X is formed in a plurality of places, and for example, from the liquid crystal layer LC toward the electrode EL along the second direction Y, the condensing part 20X is formed such that it recedes from the first substrate SUB1 along the third direction Z.

Figure 12B:
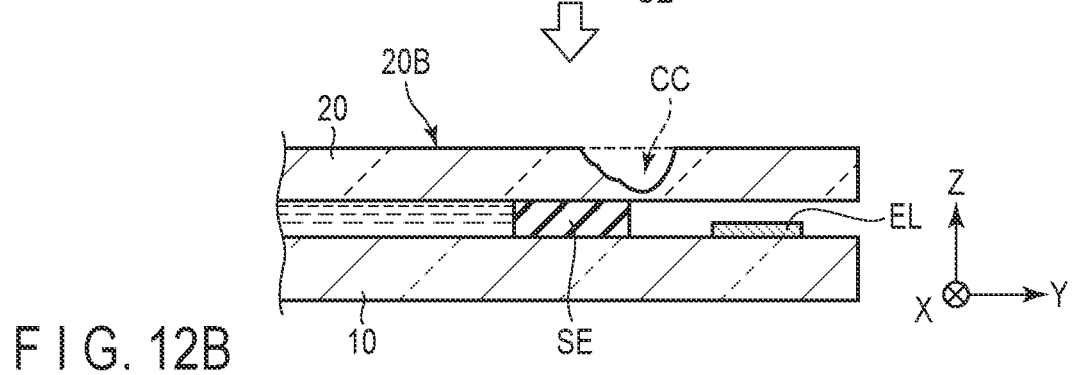

Then, as shown in FIG. 12B, the first insulating substrate 10 and the second insulating substrate 20 are reduced in thickness. For example, the first insulating substrate 10 and the second insulating substrate 20 are glass substrates, and are reduced in thickness by dissolution by an etching solution such as a hydrofluoric acid (HF) solution. In addition, the condensing part 20X shown in FIG. 12A is dissolved by the etching solution more easily than a part of glass in which the laser light is not condensed. Therefore, when the condensing part 20 is exposed to the etching solution in association with the reduction of the thickness of the second insulating substrate 20, a concave portion CC depressed toward the first insulating substrate 10 is formed on the outer surface 20B.

Figure 12C:
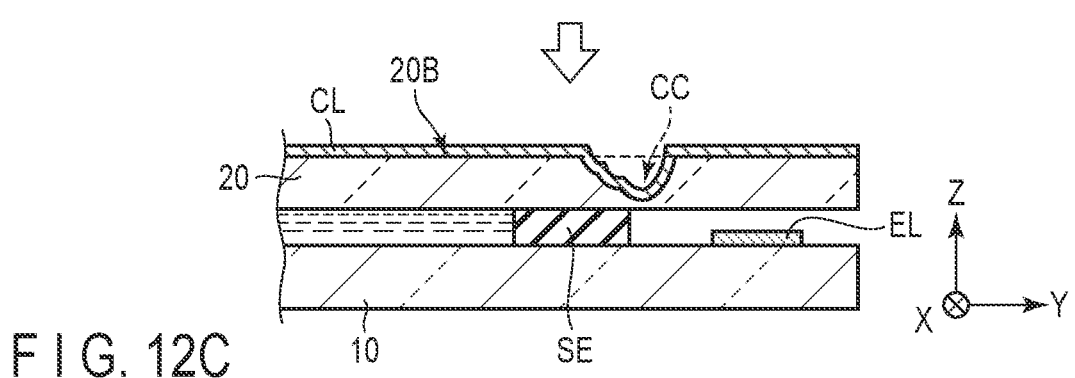

Then, as shown in FIG. 12C, the transparent conductive film CL is formed by depositing a transparent conductive material on the entire surface of the outer surface 20B including the concave portion CC.

Figure 12D:
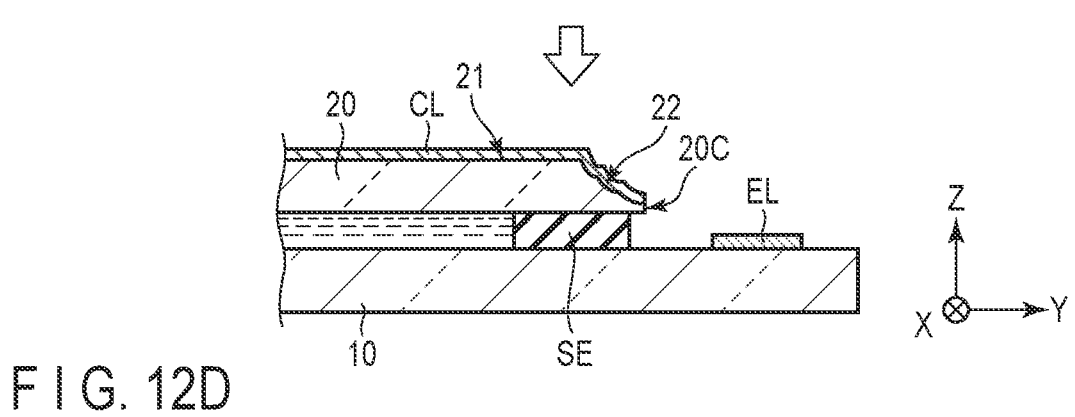

Then, as shown in FIG. 12D, a part of the second insulating substrate 20 which is opposed to the electrode EL is removed. Accordingly, the second insulating substrate 20 comprising the flat portion 21 and the sloping portion 22 is formed.

After that, although not illustrated, the optical element OD2 is bonded to the transparent conductive film CL by the adhesive layer AD. After that, a resin material having conductivity is applied continuously from the transparent conductive film CL above the sloping portion 22 to the electrode EL. The cured resin material corresponds to the connection member CN described above. Accordingly, the transparent conductive film CL and the electrode EL are electrically connected by the connection member CN. The display panels PNL of the first to third embodiments described above are obtained by applying the first formation method described here.

In addition, the deposition process of the transparent conductive material described in FIG. 12C may be omitted, and the optical element OD2 may be bonded to the flat portion 21 by the adhesive agent CA, and the connection member CN may be formed between the adhesive agent CA and the electrode EL. The display panel PNL of the fourth embodiment described above can be obtained by applying this formation method.

Furthermore, not only the deposition process of the transparent conductive material described in FIG. 12C but also the formation process of the connection member CN may be omitted, and the main body MP of the optical element OD2 may be bonded to the flat portion 21 and the sloping portion 22 and the extension portion EP may be bonded to the electrode EL by the adhesive agent CA. The display panel PNL of the fifth embodiment described above can be obtained by applying this formation method.

The sloping portion 22 is a portion sloping downward from the flat portion 21 toward the second substrate end 20C in the second insulating substrate 22, and includes not only a sloping portion having a flat sloping surface but also a sloping portion having a sloping surface which is made slightly bumpy or uneven by the first formation method or the like.

<<Second Formation Method of Sloping Portion>>

In the second formation method, the sloping portion 22 is formed by mechanically grinding the second insulating substrate 20 by a grindstone or the like. This sloping portion 22 is formed such that it is adjacent to the electrode EL in the second direction Y.

Figure 13:
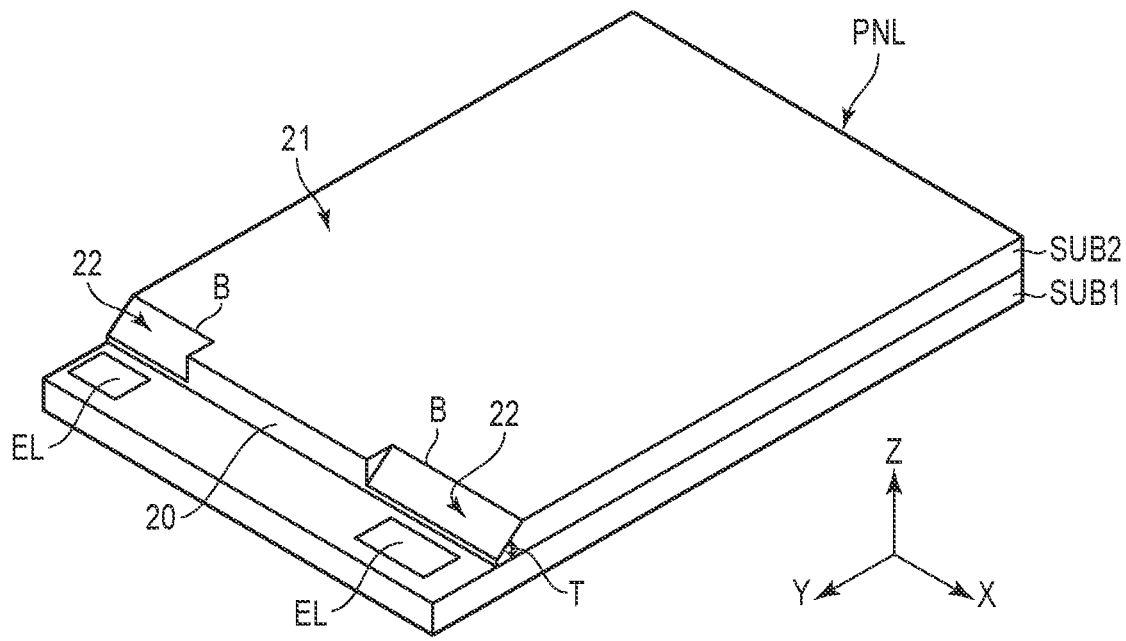
FIG. 13 is an illustration showing a formation example of the sloping portion 22.

In the example shown in FIG. 13, the sloping portion 22 is formed in a substantially rectangular shape. This sloping portion 22 is a surface crossing both the second direction Y and the third direction Z and extending parallel to the first direction X. A boundary B between the flat portion 21 and the sloping portion 22 extends along the first direction X in the XY-plane. A thickness T along the third direction Z of the sloping portion 22 decreases from the flat portion 21 toward the electrode EL along the second direction Y. Note that the thickness T of the sloping portion 22 is substantially constant along the first direction X.

Figure 14:
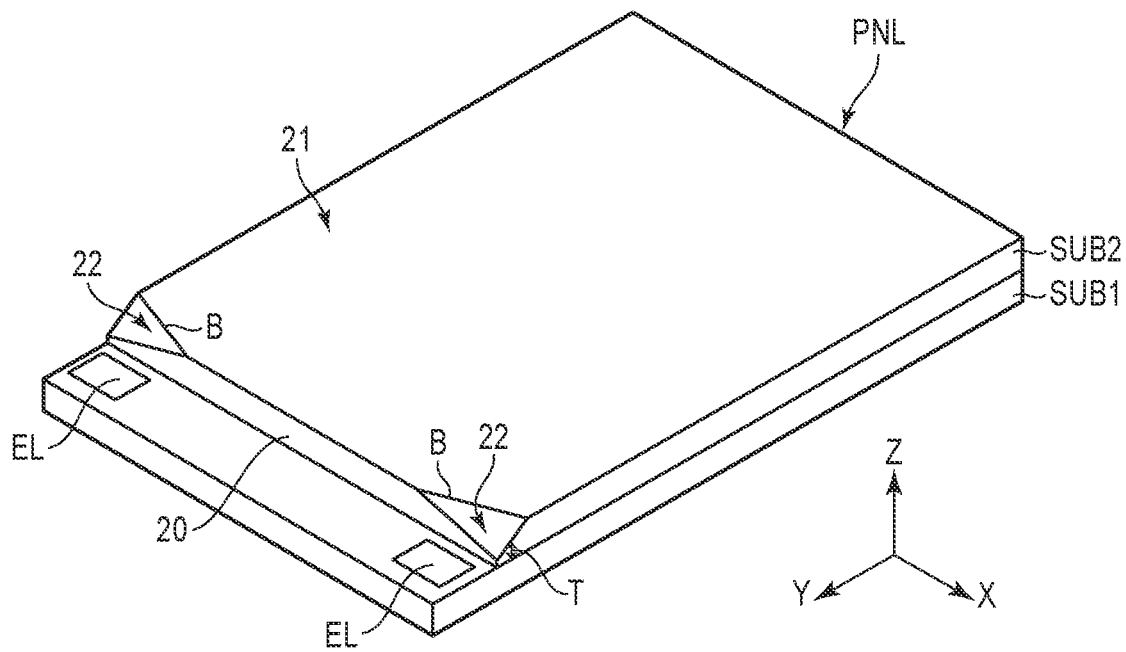
FIG. 14 is an illustration showing another formation example of the sloping portion 22.

In the example shown in FIG. 14, the sloping portion 22 is formed in a substantially triangular shape. This sloping portion 22 is a surface crossing all the first direction X, the second direction Y and the third direction Z. The boundary B between the flat portion 21 and the sloping portion 22 crosses both the first direction X and the second direction Y in the XY-plane. The thickness T of the sloping portion 22 decreases from the flat portion 21 toward the electrode EL along the first direction X and the second direction Y.

Figure 15:
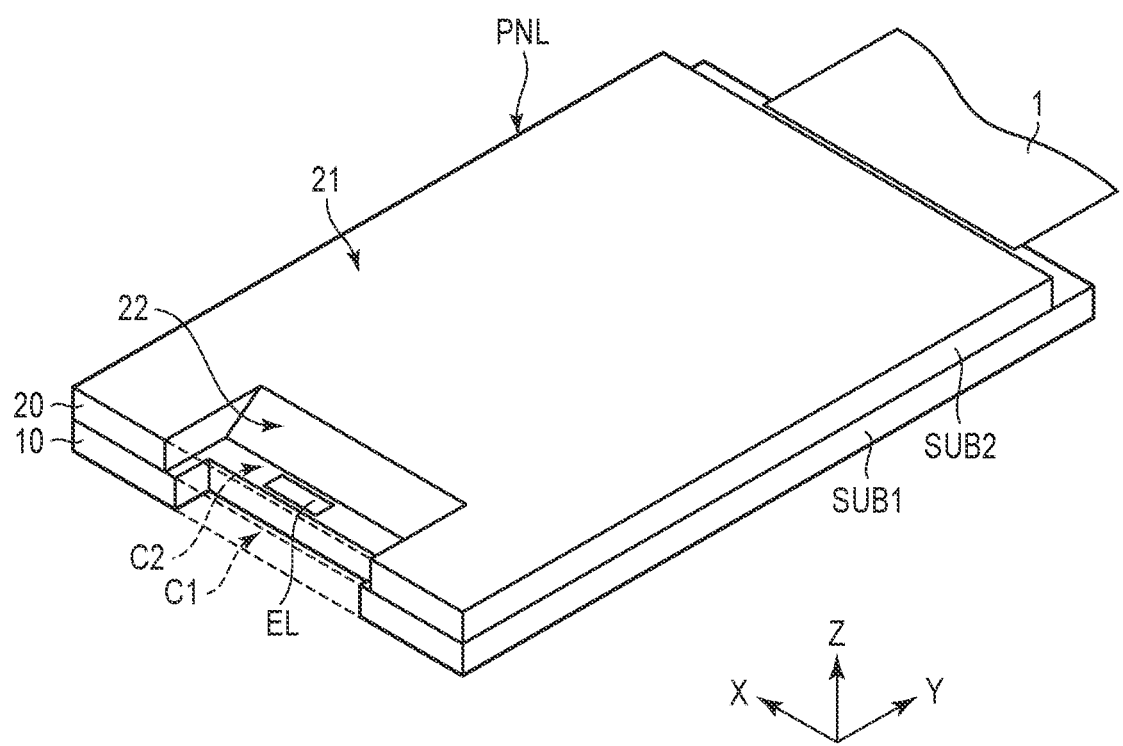
FIG. 15 is an illustration showing another formation example of the sloping portion 22.

In the example shown in FIG. 15, the first insulating substrate 10 and the second insulating substrate 20 comprise concave portions C1 and C2, respectively. The concave portions C1 and C2 are formed in a region different from a region in which the flexible printed circuit board 1 is mounted. The sloping portion 22 is disposed in the concave portion C2. This sloping portion 22 is formed, for example, in a grinding process of forming the concave portions C1 and C2.

After the sloping portion 22 described with reference to FIGS. 13 to 15 is formed, the display panels PNL of the first to third embodiments described above are obtained by forming the transparent conductive film CL on the flat portion 21 and the sloping portion 22, bonding the optical element OD2 to the transparent conductive film CL by the adhesive layer AD, and electrically connecting the transparent conductive film CL and the electrode EL by the connection member CN.

In addition, after the sloping portion 22 is formed, the display panel PNL of the fourth embodiment described above is obtained by bonding the optical element OD2 to the flat portion 21 by the adhesive agent CA, and forming the connection member CN between the adhesive agent CA and the electrode EL.

Furthermore, after the sloping portion 22 is formed, the display panel PNL of the fifth embodiment described above is obtained by bonding the main body MP of the optical element OD2 to the flat portion 21 and the sloping portion 22, and bonding the extension portion EP to the end portion EL.

As described above, according to the embodiments, a display device which can suppress reduction of reliability can be provided.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A display device comprising:
   a first insulating substrate comprising a first substrate end;
   a second insulating substrate comprising an inner surface opposed to the first insulating substrate, an outer surface on an opposite side to the inner surface, and a second substrate end;
   an electrode located between the first substrate end and the second substrate end and maintained at a predetermined potential; and
   a transparent conductive layer disposed on a side on which the outer surface is located, wherein
   the outer surface comprises a flat portion and a sloping portion formed from the flat portion to the second substrate end,
   the sloping portion slopes such that a thickness on a side on which the second substrate end is located is less than a thickness on a side on which the flat portion is located, and
   the transparent conductive layer overlaps the sloping portion and is electrically connected to the electrode.

2. The display device of claim 1, further comprising a connection member which is in contact with the electrode and the transparent conductive layer and electrically connects the electrode and the transparent conductive layer.

3. The display device of claim 2, wherein the transparent conductive layer is located between the sloping portion and the connection member.

4. The display device of claim 1, further comprising:
   an optical element; and
   an adhesive layer which bonds the optical element to the transparent conductive layer.

5. The display device of claim 4, wherein an end of the optical element projects more toward the electrode than an end of the adhesive layer.

6. The display device of claim 4, further comprising a low expansion layer located between the adhesive layer and the optical element, wherein
   a thermal expansion coefficient of the low expansion layer is less than a thermal expansion coefficient of the optical element.

7. The display device of claim 1, further comprising an optical element, wherein
   the transparent conductive layer is a conductive adhesive agent which bonds the optical element to the flat portion.

8. The display device of claim 7, wherein the transparent conductive layer is apart from the sloping portion above the sloping portion.

9. The display device of claim 8, further comprising a conductive connection member which is in contact with the electrode and the transparent conductive layer.

10. The display device of claim 7, wherein the transparent conductive layer is in contact with the electrode.

11. The display device of claim 1, further comprising an optical element comprising a main body and an extension portion, wherein
    the transparent conductive layer is an adhesive agent which bonds the main body to the flat portion and the sloping portion and bonds the extension portion to the electrode.

12. The display device of claim 1, wherein the sloping portion is formed in a substantially rectangular shape.

13. The display device of claim 1, wherein the sloping portion is formed in a substantially triangular shape.

14. The display device of claim 1, wherein
    the second insulating substrate comprises a concave portion, and
    the sloping portion is disposed in the concave portion.

15. The display device of claim 2, wherein the connection member is formed of a resin material having conductivity.

16. The display device of claim 1, wherein a width of the sloping portion is equal to a height of the sloping portion or greater than the height.

17. The display device of claim 1, wherein a width of the sloping portion is less than a height of the sloping portion.

18. The display device of claim 1, wherein a thickness of the first insulating substrate is greater than a thickness of the second insulating substrate.

* * * * *